April 26, 1932.  R. L. BROWN  1,855,334
TRACTION DRIVE
Original Filed July 8, 1927  5 Sheets-Sheet 1

FIG. I.

INVENTOR
Robert L. Brown
BY
Bothner, Hudnall, Lecher, McNamara and Michael
ATTORNEY April 26, 1932.  R. L. BROWN  1,855,334
TRACTION DRIVE
Original Filed July 8, 1927   5 Sheets-Sheet 2

INVENTOR
Robert L. Brown
BY
ATTORNEY

April 26, 1932.    R. L. BROWN    1,855,334
TRACTION DRIVE
Original Filed July 8, 1927    5 Sheets-Sheet 3

INVENTOR
Robert L. Brown
BY
ATTORNEY

April 26, 1932. R. L. BROWN 1,855,334
TRACTION DRIVE
Original Filed July 8, 1927    5 Sheets-Sheet 5
FIG. 7.
FIG. 8.
FIG. 10.
FIG. 9.
FIG. 11.
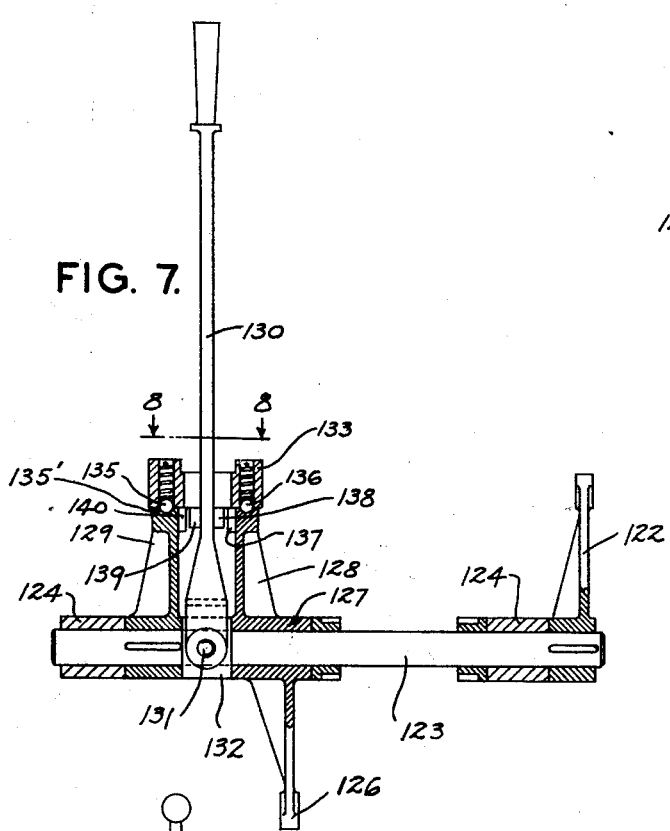
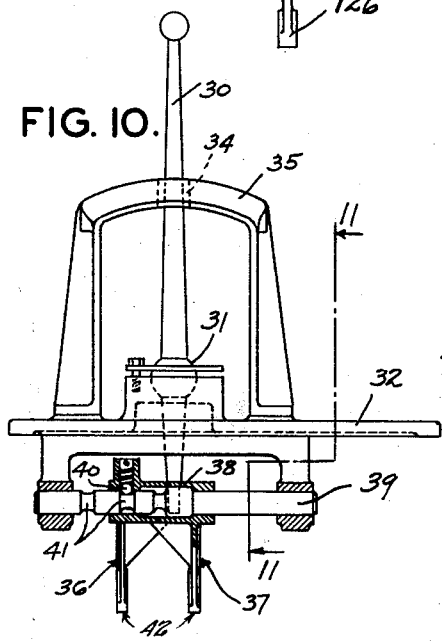
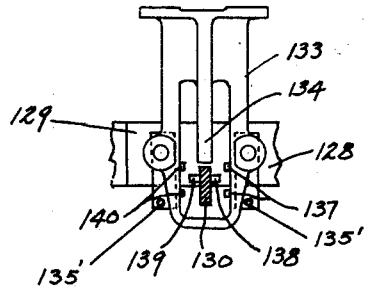
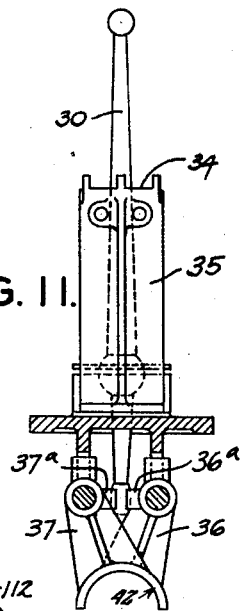
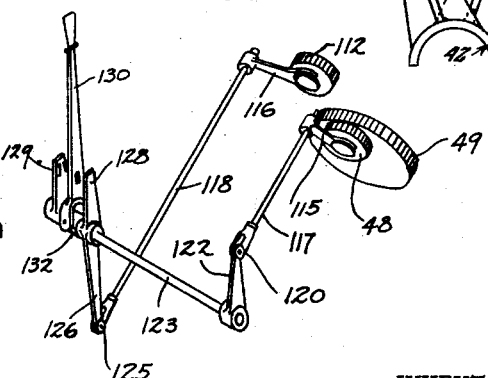
INVENTOR
Robert L. Brown
BY
ATTORNEY Patented Apr. 26, 1932

1,855,334

UNITED STATES PATENT OFFICE

ROBERT L. BROWN, OF MILWAUKEE, WISCONSIN, ASSIGNOR TO HARNISCHFEGER CORPORATION, OF MILWAUKEE, WISCONSIN, A CORPORATION OF WISCONSIN

TRACTION DRIVE

Original application filed July 8, 1927, Serial No. 204,225. Divided and this application filed January 4, 1929. Serial No. 330,327.

This invention relates in general to excavating machinery and more particularly to a traction drive especially designed and adapted for use in a trencher. The present application is a division of the application of Robert L. Brown for trenching machines filed July 8, 1927, Serial No. 204,225, now Patent No. 1,756,971, granted May 6, 1930.

In trenching machines, it is advantageous to have a traction drive so constituted as to provide a relatively high speed or so-called high traction for driving the machine when travelling from place to place and it is essential to have a low speed or a so-called low traction for feeding the machine forwardly when digging. The present invention proposes a traction drive of such character as to provide variable speed and power ratios in both high and low traction so that when the machine is travelling from place to place there is available within the high traction range a relatively low speed for steep hills or hard pulls and higher speeds for easy travel. Further, when digging, a low speed and high power ratio is available when working against boulders, hard pan or frost or when working out of cave-ins or under similar circumstances, whereas with easy digging a relatively high speed feed is had.

To preclude liability of damage or injury to the mechanism, the present invention further provides for an interlocking control for the two change speed gear sets which afford the variable speed and power ratios in the high and low traction movements, whereby one set is always rendered inoperative when the other set is placed in condition for operation.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 7 is a view partly in side elevation and partly in section showing the interlocking control for the shiftable pinions of the traction drive which alternately engage the master gear of the differential thereon;

Figure 8 is a view in horizontal section on line 8—8 of Figure 7;

Figure 9 is a diagrammatic perspective view illustrating the action of the interlocking control;

Figure 10 is a view in elevation showing the lever operated shifting forks employed for the change speed gearing, parts being shown in section for the sake of illustration;

Figure 11 is a view in section on line 11—11 of Figure 10 parts being shown in elevation for the sake of simplicity in illustration.

For a disclosure of the general construction of a trencher of the type to which present invention is shown to apply, reference is made to the pending application of Robert L. Brown for trenching machines filed July 8, 1927, Serial No. 204,225. For the purposes of the present invention, it is sufficient to understand that a trenching machine of this character includes a pair of traction devices T usually of the endless track or self laying track type, a portion of one of which is shown at 3 in Figure 6. The frame 66 of each traction device T is connected in supporting relation to the main frame 64 of the trencher by means of a fixed sleeve 63 secured to these parts.

The traction devices T are driven from a power plant P mounted on the trencher and usually in the form of an internal combustion engine by mechanism which will now be described. The present invention resides in the novel mechanism for effecting the drive of the traction devices in a manner as will hereinafter appear.

High or road traction

Figure 2:
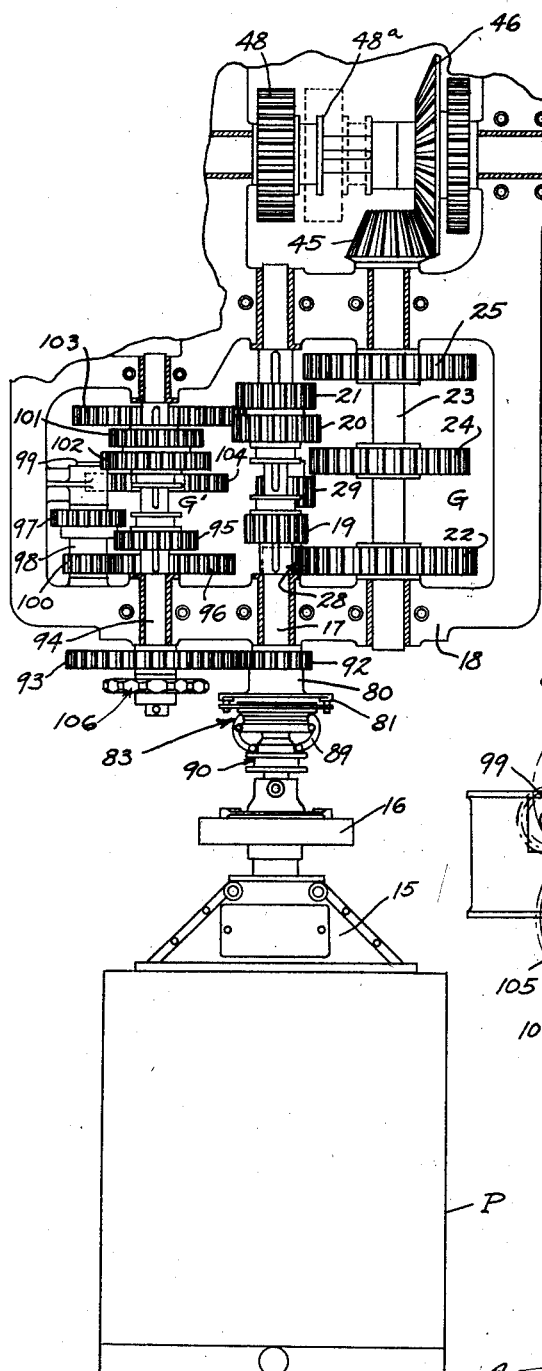
Figure 2 is a plan view of the part shown in Figure 1, the upper or cover sections of the casing or housing and the parts carried thereby being removed to illustrate the gearing and shafting provided in the housing.
Figure 4:
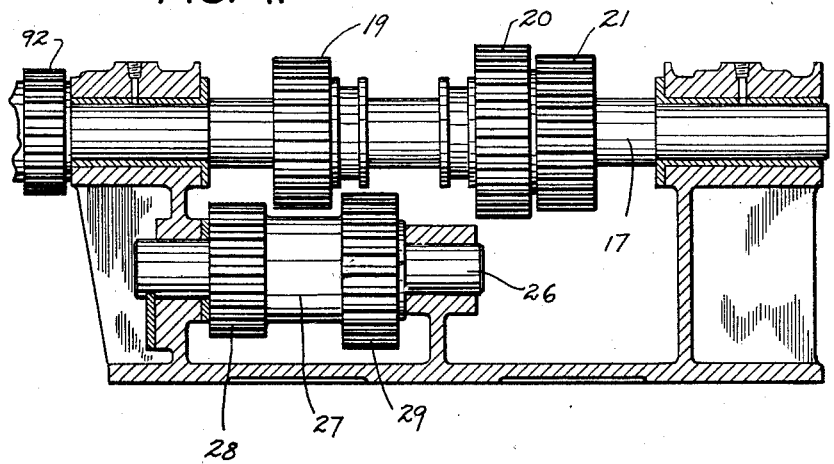
Figure 4 is a fragmentary view in section taken in the plane on line 4—4 of Figure 3 and illustrating certain features of the construction of the speed change mechanism.

Referring now to Figure 2, it will be seen that the power plant illustrated diagrammatically at P is connected through a clutch 15 and flexible coupling 16 with a main shaft 17 journaled in bearings provided therefor in a single piece lower housing section or casing 18. This main drive shaft 17 constitutes the drive shaft of a selective change speed gear set G of the sliding gear type and has splined thereon a low speed pinion 19 and a pair of pinions designated at 20 and 21, the pinion 21 being fixed on an extension of the hub of the pinion 20 so that these two gears 20 and 21 are shifted longitudinally of and rotate with the shaft 17 as a unit. The slidable gear 19 is adapted to be brought into mesh with a low speed and reverse gear 22 fixed on a driven shaft 23 also rotatably mounted in bearings provided therefor in the main or lower section 18 of the casing. Similarly, the pinions 20 and 21 are adapted to be selectively meshed with driven gears 24 and 25, respectively, the gears 24 and 25 also being fixed on the driven shaft 23. When the gear 20 meshes with the gear 24, a high speed is obtained whereas when the pinion 21 is meshed with the gear 25 a second or intermediate speed is had. To provide for reverse a countershaft 26 is journaled in bearings provided therefor in the section 18 as shown in Figure 4 and on the countershaft 26 a sleeve 27 is rotatably mounted and has a pinion 28 fixed thereto and constantly meshing with the low speed and reverse gear 22 and also has a gear 29 with which the low speed and reverse pinion 19 may be brought into mesh. The pinion 28 and gear 29 may be integral with the sleeve 27 or otherwise rigidly secured thereto.

Figure 12:
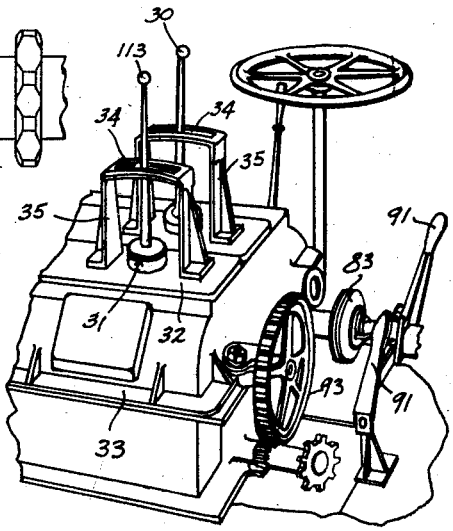
Figure 12 is a fragmentary perspective view further illustrating certain of the lever controls.

The pinions 19, 20 and 21 are shifted from a gear shift lever 30 (see Figures 1, 10, 11 and 12) having a universal mounting indicated at 31 in the removable top plate 32 of a cover section 33. The portion of the lever adjacent its upper end coacts with an H-slot 34 provided in a bracket 35 fixed to the removable top plate 32 (see Figure 12). The lower end of the lever 30 is flattened and enlarged transversely and is laterally shiftable to selectively coact with sets of lugs 36ª and 37ª formed on shifters, the shifters being designated respectively by the numerals 36 and 37. The shifters are of similar construction and each includes a sleeve-like body portion 38 slidably mounted on a fixed supporting shaft 39 and having a spring projected ball or detent 40 selectively engageable with spaced recesses 41 on the supporting shaft 39 for holding the shifter in any one of its adjusted positions. Shifting forks 42 are integral with the sleeve-like bearing portions 38 of the shifters and coact respectively with the annular grooves of the hubs of the slidable pinions with which they are associated.

Figure 6:
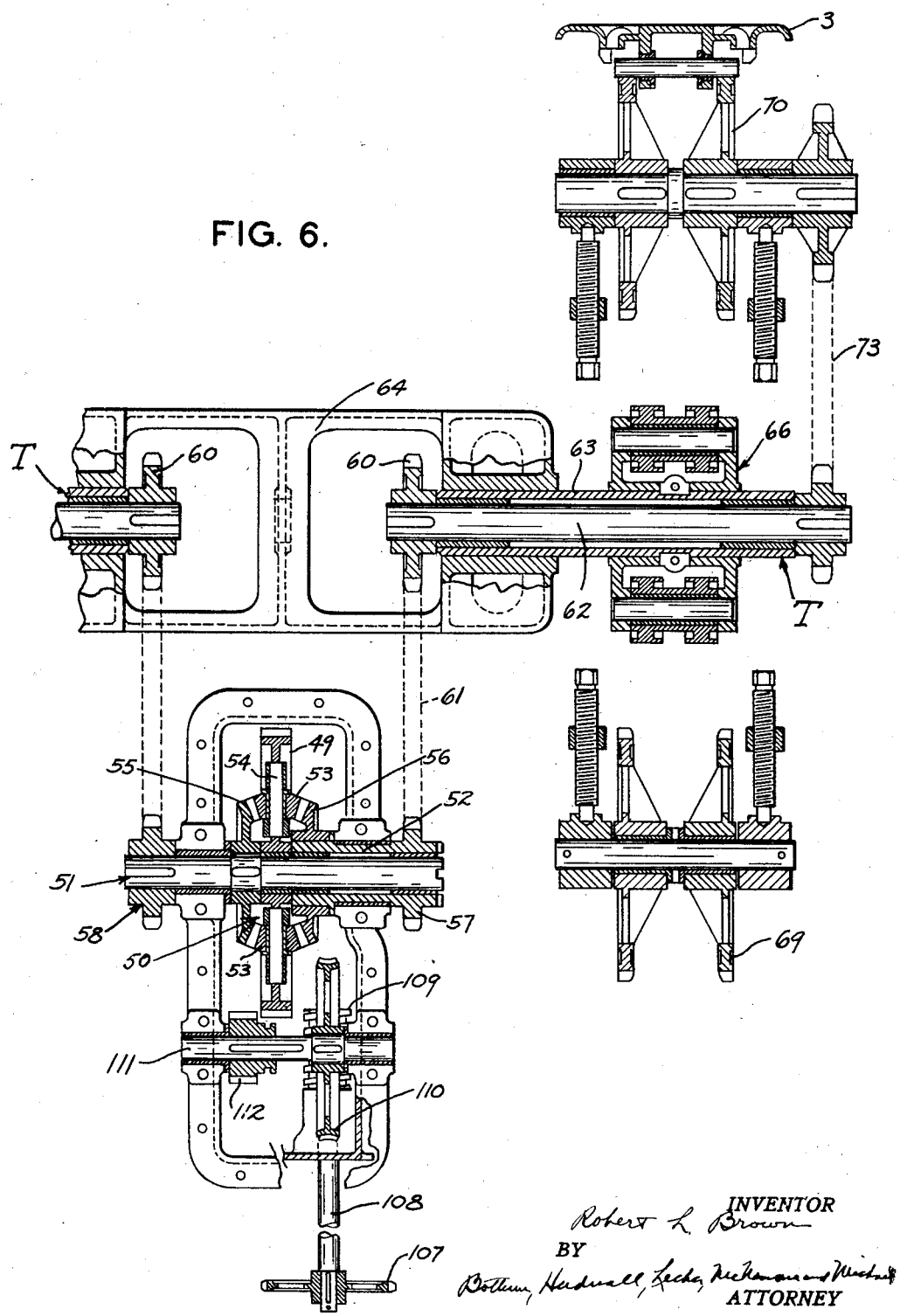
Figure 6 is a fragmentary group view partly in horizontal section on line 6—6 of Figure 1 but further illustrating in horizontal section and in top plan the operative connection between the traction drive and one of the traction devices of a trencher, parts being omitted for the sake of simplicity in illustration.

Beveled pinion 45 is fixed to the rearward end of the shaft 23 and constantly meshes with a beveled gear 46 fixed on an intermediate transversely extending shaft 47 journaled in suitable bearings provided therefor on the main section 18 of the casing. A shiftable pinion 48 is splined on the intermediate portion of the shaft 47 and has a grooved hub extension 48ª adapted to coact with a shifter fork as will be hereinafter more fully described. This pinion 48 in one of its positions overlies and meshes with the master gear 49 of a differential designated generally at 50 and mounted in a lower section of the casing below and just rearwardly of the transverse shaft 47 (see Figures 1 and 6). In another position of the pinion 48, that is, in the position shown in dotted lines in Figure 2, it is disengaged from the master gear of the differential. As shown in Figure 6, the master gear 49 of the differential is rotatably mounted on an inner solid shaft 51 journaled in a suitable bearing provided therefor on the casing and rotatably fitted in an appropriately bushed sleeve shaft 52 which is also rotatably mounted in a bearing provided for the same on the casing. Differential pinions 53 are rotatably mounted on radial studs 54 carried by the master gear 49 and these differential pinions mesh with confronting beveled gears 55 and 56 fixed respectively to the inner solid shaft 51 and to the outer sleeve shaft 52. The sleeve shaft 52 projects to one side of the casing 18 and the projecting portion has a sprocket wheel 57 integrally formed therewith or otherwise rigidly connected thereto. The solid shaft 51 projects beyond the opposite side of the casing and has a sprocket wheel 58 fixed thereto.

As shown in Figure 6, the sprocket wheels 57 and 58 are in fore and aft alinement with the sprocket wheels 60 of the traction devices T and these sprocket wheels 57 and 58 are operatively connected with the sprocket wheels 60 by means of sprocket chains 61. As the traction devices T are of identical construction, a single description will serve for both. Each sprocket wheel 60 is fixed to the inner end of a rotatable shaft 62 rotatably supported in the fixed sleeve 63 of its traction device. The outer end of each shaft 62 projects beyond its sleeve 63 and is connected by chain and sprocket gearing 73 to driving sprockets 70 which coact with the associated endless belt 3 to drive the same. The mounting of these driving sprockets 70 and the mounting of the idler sprockets 69 on the frame of the traction device shown in Figure 6 is illustrated diagrammatically as this structure is well known and as the details thereof per se form no part of this invention.

From the foregoing, it will be understood that when the pinion 48 is engaged with the master gear 49 of the differential 50, high or road traction is had and by manipulating the gear shift lever 30 and the clutch 15 the advantage of three forward speeds and a reverse are available. Thus, in high traction there is provided a low speed for steep hills and hard pulls, and high speed for easy travel.

*Feed or low traction*

For imparting a slow forward feeding movement to the trencher when digging, provision is made for imparting a feed or low traction movement to the traction devices T and with the present invention this feed traction is had through a variable speed gear set G' of the selective type. In carrying out these purposes, a sleeve 80 is rotatably mounted on the forward end of the main drive shaft 17 just outside of the main section 18 of the casing (see Figures 1 and 2). At its forward end the sleeve 80 is provided with a flange 81 on which a driven friction disc 82 of a clutch designated generally at 83 is carried. The clutch 83 also includes a sleeve 84 keyed to the drive shaft 17 and having an integral flange 85 at its inner end. This flange 85 has a friction ring 86 interposed between it and one face of the driven friction disc 82. A similar friction ring 87 is engageable with the opposite face of the driven friction disc 82 and the engagement of these parts is controlled by a pressure ring 88 mounted on the sleeve 84 and controlled by camming lever arms 89 to which a shiftable collar 90 imparts operative movements. It is to be understood that any appropriate clutch may be employed for clutching the sleeve 80 to the shaft 17. The collar 90 is controlled by clutch levers 91 (see Figure 12) duplicated to facilitate operation of the clutch 83 from either side of the machine and having the usual shifting fork engaging in an annular groove in the collar. As shown in Figure 2, the sleeve 80 has a pinion 92 at its rearward end, this pinion 92 constantly meshing with a gear wheel 93 fixed to the forward end of the driving shaft 94 of a change speed gear set G' of the selective type. A cover is provided for these gears 92 and 93 but is removed for the sake of illustration. Preferably this gear set G' is of the type wherein sliding gears are provided to obtain the desired forward speed or reverse and in fact this gear set G' is the same as the gear set G employed with the high traction arrangement hereinabove described except for variations in the gear ratios as will be understood from the drawings.

Figure 3:
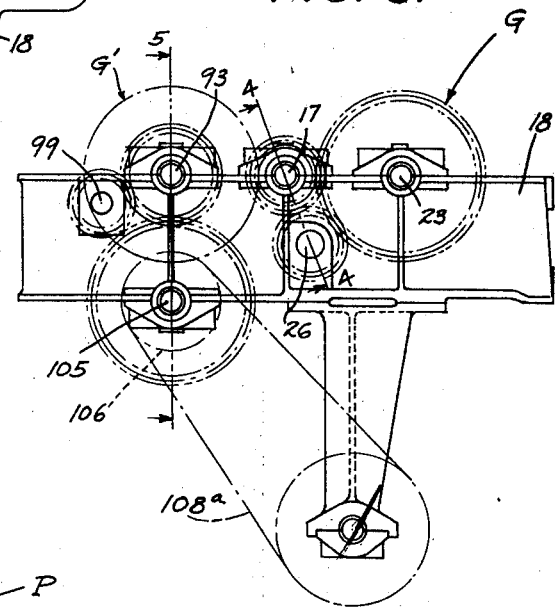
Figure 3 is a diagrammatic view in front elevation of the parts shown in Figure 2.
Figure 5:
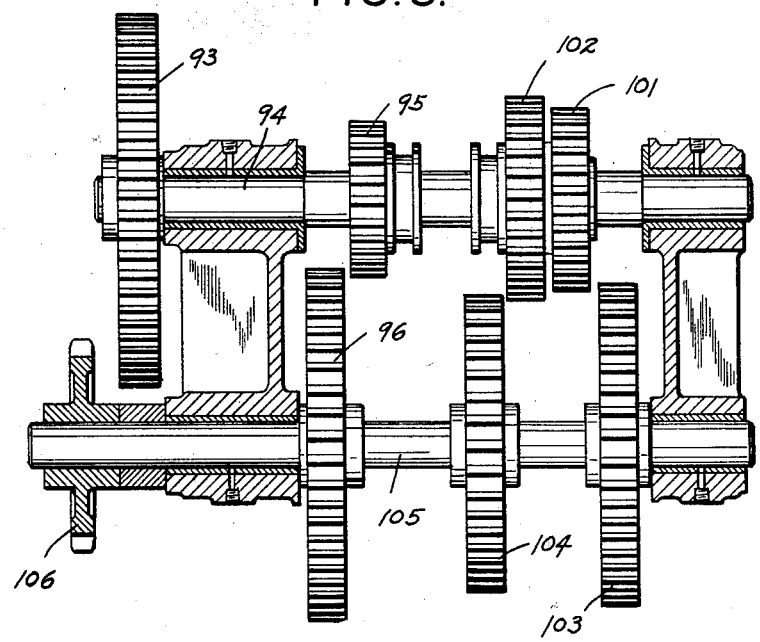
Figure 5 is a similar view taken on line 5—5 of Figure 3.

As shown in Figures 2, 3 and 5, a low speed and reverse pinion 95 is splined on the drive shaft 94 and is engageable with a low speed driven gear 96, when shifted forwardly. When shifted rearwardly, this pinion 95 is engageable with a gear 97 of the reversing arrangement substantially the same as that shown in Figure 4 and embodying a sleeve 98 rotatably mounted on a countershaft 99 and having the gear or pinion 97 and also a second pinion 100 fixed thereto and constantly meshing with the driven gear 96. A second or intermediate speed gear 101 and a high speed gear 102 are also splined on the shaft 94 and are selectively engageable with driven gears 103 and 104, respectively, the driven gears being fixed on the driven shaft 105 to which the driven gear 96 is also fixed.

Figure 5 illustrates in detail just how the intermediate and high speed driving gears of both gear sets G and G' are mounted on the driving shaft.

The forward end of the driven shaft 105 projects through the forward end of the section 18 of the casing and the projecting portion of this driven shaft 105 has a sprocket wheel 106 fastened thereto (see Figure 5 and compare Figures 2 and 3). The sprocket wheel 106 is connected to a sprocket wheel 107 by means of a sprocket chain 108ᵃ (see Figure 3). As illustrated in Figure 6, the sprocket wheel 107 is fastened to the forward end of the worm shaft 108, the worm shaft 108 extending rearwardly into a lower section of the casing and being rotatably mounted in bearings provided therein. Within the casing this shaft 108 carries a worm 109 which meshes with a worm wheel 110 fixed to a transverse shaft 111 journaled in the casing section 18 above the worm shaft 108. A pinion 112 is splined on the shaft 111 and may be shifted or positioned to mesh with the master gear 49 of the differential and also may be positioned to be disengaged from this master gear.

When the pinion 112 is engaged with the master gear of the differential, feeding movement may be imparted to the traction devices by manipulating the clutch 83 and by shifting the gear shift lever 113. This gear shift lever 113 controls the action of the gear set G' of the feed traction drive through a shifting fork arrangement identical with that shown in Figures 10 and 11, and hereinabove described.

Interlocking control for high and feed traction

From the foregoing, it will be understood that the selection of high or feed traction is determined by shifting the pinions 48 or 112 into engagement with the master gear 49 of the differential 50. It would be extremely undesirable and probably would result in serious damage to the machine if a careless operator engaged both of these pinions 48 and 112 with the master gear of the differential and attempted to bring into action the high and the low traction at the same time. To preclude any possibility of this an interlocking control is provided for the high and low traction whereby when the pinion 48 is engaged with the master gear 49 of the differential the pinion 112 is necessarily and automatically disengaged therefrom and vice versa.

Figure 1:
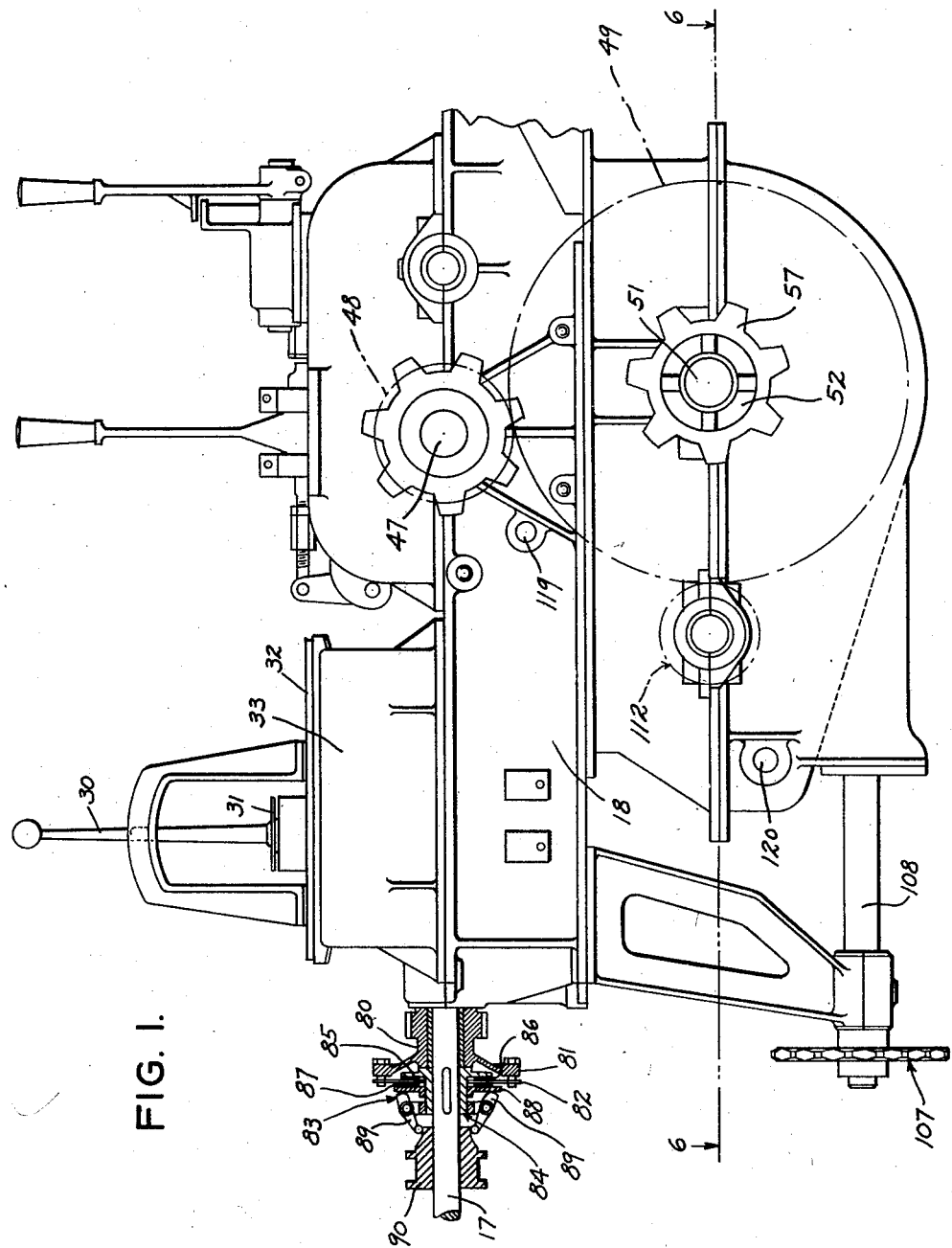
Figure 1 is a fragmentary view in side elevation of a portion of the main machinery unit of a trencher employing a traction drive embodying the present invention, parts being shown in section and parts being omitted for the sake of illustration.

Referring now to Figures 1, 7, 8 and 9, it will be seen that shifting forks 115 and 116 are provided for the pinions 48 and 112, respectively, the shifting forks 115 and 116 being respectively fixed on sliding shift rods 117 and 118 mounted for sliding movement in bearings 119 and 120 provided on the casing (see Figure 1). The shift rod 117 is pivotally connected as at 120 to the upper end of an upwardly extend crank arm 122 fixed to one end of a rock shaft 123 journaled in bearing brackets 124 (see Figure 7) provided therefor and fixed to the structural frame of the machine. The outer end of the shift rod 118 is pivotally connected as at 125 to the downwardly extending arm 126 of a double crank designated generally at 127 and loosely mounted on the rock shaft 123. This double crank 127 also has an upwardly extending crank arm 128. Opposite with respect to and confronting the arm 128 of the double crank is a third crank arm 129 which is keyed to the rock shaft 123. A control lever 130 is provided in between the arms 128 and 129 and has its lower end bifurcated and pivoted on trunnions 131 of a collar 132 loosely fitted on the rock shaft 123. With this mounting of the lever it may be shifted or swung in a substantially vertical plane and may be also adjusted angularly about the rock shaft. The lever 130 operates in a slotted bracket 133 (see Figure 8) fastened to the side of the casing and having its slot or opening divided for part of its length by a partition bar 134 constituting a guide for preventing lateral movement of the lever in certain phases of its movements. The bracket 133 also has spring projected balls or detents 135 and 137 engageable with spaced recesses 135' in the arms 128 and 129 to releasably hold these arms in their several adjustments. The upper ends of the arms 128 and 129 are of arcuate form and some portion of the upper ends of these arms underlies the spring projected detents in all adjustments of the arms. When the lever 130 is positioned outwardly beyond the partition or guide bar 134, it may be swung laterally in either direction. When swung laterally toward the arm 128 a laterally projecting lug 138 on the lever is engaged between a pair of similar lugs 137 provided on the arm 128 and when so engaged the lever may be swung angularly about the rock shaft 123 to rotate the double crank 127 and shift the pinion 112 into engagement with the master gear 49 of the diffential. At this time the pinion 48 is necessarily disengaged from the master gear of the differential. To disengage the pinion 112 from the master gear of the differential the control lever 130 is swung outwardly to correspondingly adjust the double crank 127 and the shift rod. Not until the pinion 112 has been completely disengaged from the master gear 49 of the differential is the control lever 130 free to shift laterally, the dividing bar or guide bar 134 constraining against lateral shifting up to this time. However, when the complete disengagement of the pinion 112 has been effected then the lever 130 is positioned in the unobstructed portion of the slot of the bracket and may be shifted laterally away from the arm 128 and toward the arm 129 whereupon a lug 139 on the opposite side of the lever from the lug 138 engages a similar pair of lugs 140 on the crank arm 129. With this lateral adjustment of the lever it may again be swung inwardly to rock the rock shaft through the crank arm 129 and to so slide the shift rod 117 from the crank arm 122 as to engage the pinion 48 with the master gear of the differential. In each instance it is impossible to engage either pinion 48 or 112 with the master gear of the differential until the other has been completely disengaged therefrom.

Another advantage of this interlocking control is that the control lever 130 is always swung inwardly and out of the way of the operator when the machine is moving, this advantage following from the provision of the oppositely directed crank arms 122 and 126, the first of which extends upwardly from the shaft 123 while the other extends downwardly therefrom.

While the digging is progressing, feed traction is had through the gear set G' which is independent of the gear set G driving the digging chains and buckets. This is a feature which makes it entirely practical to vary the speed and power ratio as may be warranted by the load on the digging chains and buckets and this variation is had while permitting an independent or a parallel variation in the speed of feed.

When traveling from place to place, high speed traction is available through the gear set G and yet the high traction means are practically the only parts set in motion at this time.

Many of the important objects and advantages have been stressed with particularity in the foregoing description, but in this connection it is to be understood that various changes in the size, arrangement and construction of the parts is contemplated within the spirit of the invention and the scope of the subjoined claims.

The invention claimed is:

1. A machine of the character described including a frame, traction means for the frame, a traction drive including a pair of shafts, a differential having driven gears fixed to the shafts, a single master gear, differential pinions carried by the master gear and meshing with the driven gears, and means for driving the master gear of the differential at different speed and power ratios including a plurality of shiftable pinions selectively engageable with the single master gear of the differential at angularly spaced points.

2. A drive for the traction devices of excavating machinery or the like, comprising a power plant and two change speed gear sets of the selective type adapted to be independently actuated from the power plant and each having a different range of speed and power ratios, one change speed gear set being adapted to impart variable low speed feeding movement to the traction devices for digging, and the other being adapted to impart variable high speed movement thereto for road travel.

3. A drive for the traction devices of excavating machinery comprising a power plant, two change speed gear sets independently actuated from the power plant, a differential having its driven elements connected to the traction devices and having a single master gear and two shiftable pinions selectively engageable with the single master gear of the differential at angularly spaced points, one pinion being driven from one of the change speed gear sets and the other pinion being driven from the other change speed gear set.

4. A drive for the traction devices of excavating machinery and the like comprising a motor driven drive shaft, two change speed gear sets driven from said shaft and each having a different range of speed and power ratios, a differential operatively connected to said traction devices, driven shafts extending across the sun gear of the differential at angularly spaced points about its periphery, pinions splined on said shafts and selectively engageable with the sun gear of the differential, and motion transmission means for driving one driven shaft from one gear set and the other driven shaft from its other gear set.

5. A drive for the traction devices of excavating machinery and the like comprising a motor driven main shaft, a change speed gear set of the selective type having a range of speed and power ratios adapting it for use in high or road traction organized with the main shaft, whereby the main shaft constitutes the drive shaft of said gear set, a second change speed gear set of the selective type having a range of speed and power ratios adapting it for low or feed traction, a sleeve shaft mounted on the main shaft, a clutch between the sleeve shaft and the main shaft, a driving connection between said sleeve shaft and said second change speed gear set, a gear wheel connected with the traction devices, and operable to drive the same when actuated, shiftable pinions selectively engageable with the gear wheel at angularly spaced points and motion transmission means for driving one pinion from one gear set and the other pinion from the other gear set.

In witness whereof, I have hereto affixed my signature.

ROBERT L. BROWN.